US009585157B2

United States Patent
Kim et al.

(10) Patent No.: US 9,585,157 B2
(45) Date of Patent: Feb. 28, 2017

(54) METHOD AND APPARATUS FOR ALLOCATING MINIMUM GUARANTEED RESOURCE AMOUNT TO ACCESS POINT IN WIRELESS ACCESS SYSTEM

(75) Inventors: Ji Hwan Kim, Daejeon (KR); Byoung Hoon Kim, Anyang-si (KR); Jeonghoon Mo, Seoul (KR); Jeong Ho Kwak, Daejeon (KR); Jae Won Lim, Anyang-si (KR); Song Chong, Daejeon (KR)

(73) Assignees: LG ELECTRONICS INC., Seoul (KR); Industry-Academic Cooperation Foundation Yonsei University, Seoul (KR)

( * ) Notice: Subject to any disclaimer, the term of this patent is extended or adjusted under 35 U.S.C. 154(b) by 113 days.

(21) Appl. No.: 14/344,288

(22) PCT Filed: Dec. 14, 2011

(86) PCT No.: PCT/KR2011/009611
§ 371 (c)(1),
(2), (4) Date: Mar. 11, 2014

(87) PCT Pub. No.: WO2013/047952
PCT Pub. Date: Apr. 4, 2013

(65) Prior Publication Data
US 2014/0369217 A1    Dec. 18, 2014

Related U.S. Application Data

(60) Provisional application No. 61/538,947, filed on Sep. 26, 2011.

(51) Int. Cl.
*H04W 72/08* (2009.01)
*H04W 16/12* (2009.01)
(Continued)

(52) U.S. Cl.
CPC ......... *H04W 72/082* (2013.01); *H04W 16/12* (2013.01); *H04W 24/08* (2013.01); *H04W 72/0493* (2013.01)

(58) Field of Classification Search
CPC ..... H04L 47/10; H04L 43/50; H04L 12/2697; H04L 43/0852; H04L 43/00
(Continued)

(56) References Cited

U.S. PATENT DOCUMENTS 6,748,220 B1 *  6/2004  Chow .................. H04W 72/08
                                                   455/450
8,937,970 B2 *  1/2015  Maciel ................. H04L 5/0064
                                                   370/330
(Continued)

FOREIGN PATENT DOCUMENTS

KR  10-2010-0086028   7/2010
KR  10-2011-0042096   4/2011
(Continued)

*Primary Examiner* — Mark Rinehart
*Assistant Examiner* — Sanjay K Dewan
(74) *Attorney, Agent, or Firm* — Lee Hong Degerman Kang & Waimey

(57) ABSTRACT

The present invention relates to a method in which an upper layer entity allocates resources to a plurality of access points (APs) in a wireless access system, including the plurality of APs and the upper layer entity for managing the plurality of APs, the method comprising the step of: sensing a change in minimum guaranteed resource amount allocated to each of the APs; acquiring, from each of the APs, AP-level topology information according to a degree of interference with adjacent APs and AP weight information given to each AP by a service provider; determining a minimum guaranteed resource amount for each of the APs based on the acquired AP-level topology information and AP weight information;

(Continued)

and transmitting the determined minimum guaranteed resource amount to each of the APs.

8 Claims, 10 Drawing Sheets

(51) Int. Cl.
*H04W 24/08* (2009.01)
*H04W 72/04* (2009.01)

(58) Field of Classification Search
USPC .................. 370/252, 329–330, 336–338, 370/395.4–395.43
See application file for complete search history.

(56) References Cited

U.S. PATENT DOCUMENTS

| | | | | |
|---|---|---|---|---|
| 8,942,161 | B2* | 1/2015 | Gupta | H04W 52/243 370/326 |
| 9,143,885 | B2* | 9/2015 | Kimura | H04W 4/00 |
| 2003/0125040 | A1* | 7/2003 | Walton | H04B 7/0417 455/454 |
| 2006/0140115 | A1* | 6/2006 | Timus | H04L 47/10 370/230 |
| 2007/0218910 | A1* | 9/2007 | Hill | H04W 92/12 455/445 |
| 2007/0274256 | A1* | 11/2007 | Murai | H04W 72/085 370/328 |
| 2008/0057970 | A1* | 3/2008 | Takada | H04W 36/18 455/450 |
| 2008/0186892 | A1* | 8/2008 | Damnjanovic | H04W 52/0216 370/311 |
| 2009/0268684 | A1* | 10/2009 | Lott | H04W 72/087 370/329 |
| 2010/0008316 | A1* | 1/2010 | Liu | H04W 72/082 370/329 |
| 2010/0087221 | A1* | 4/2010 | Srinivasan | H04W 16/08 455/522 |
| 2010/0315949 | A1* | 12/2010 | Agarwal | H04B 7/18515 370/235 |
| 2010/0322141 | A1* | 12/2010 | Liu | H04W 24/10 370/315 |
| 2011/0014918 | A1* | 1/2011 | Padfield | H04W 28/08 455/442 |
| 2011/0287799 | A1* | 11/2011 | Rayne | H04W 28/20 455/509 |
| 2012/0051299 | A1* | 3/2012 | Thakolsri | H04W 28/22 370/329 |
| 2012/0064907 | A1* | 3/2012 | Jung | H04W 28/26 455/452.1 |
| 2013/0225181 | A1* | 8/2013 | Radulescu | H04W 36/22 455/442 |
| 2014/0098778 | A1* | 4/2014 | Valentin | H04W 4/001 370/329 |
| 2014/0204854 | A1* | 7/2014 | Freda | H04L 1/18 370/329 |
| 2015/0163043 | A1* | 6/2015 | Lee | H04L 5/0073 370/336 |

FOREIGN PATENT DOCUMENTS

| | | |
|---|---|---|
| KR | 10-2011-0072110 | 6/2011 |
| WO | 2010/093644 | 8/2010 |

* cited by examiner

METHOD AND APPARATUS FOR ALLOCATING MINIMUM GUARANTEED RESOURCE AMOUNT TO ACCESS POINT IN WIRELESS ACCESS SYSTEM

CROSS-REFERENCE TO RELATED APPLICATIONS

This application is the National Stage filing under 35 U.S.C. 371 of International Application No. PCT/KR2011/009611, filed on Dec. 14, 2011, which claims the benefit of U.S. Provisional Application Serial No. 61/538,947, filed on Sep. 26, 2011, the contents of which are all hereby incorporated by reference herein in their entirety.

TECHNICAL FIELD

The present invention relates to a wireless access system and more particularly, a method and apparatus for allocating minimum guaranteed resource amount to an access point (or wireless infrastructure).

BACKGROUND ART

There are various methods available for preventing performance degradation due to inter-cell interference in an environment where a single network service provider operates multiple cells by using multiple access points (APs).

Methods for managing inter-cell interference can be divided largely into two groups: methods dividing neighboring cells and frequency bands so that separate frequency bands having no interference upon each other are allocated to the respective cells and those methods using the same frequency bands but reducing interference on the neighboring cells by reducing power consumed in a cell affecting large interference on its neighboring cells through appropriate power control.

It is well known that in case a method for controlling inter-cell interference through power control employs only one channel (or carrier), an optimal form of power control controls only the minimum and maximum power rather than increase or decrease the power in an appropriate manner. Such kind of control is usually called bang-bang control, and the on-off state of each wireless infrastructure can be defined as a pattern.

FIG. 1 illustrates one form of pattern control for controlling inter-cell interference in the case of two cells.

With reference to FIG. 1, in the case of two wireless infrastructures, a total of three patterns are possible, consisting of 'pattern 1' employing both of the two infrastructure, 'pattern 2' employing only first infrastructure, and 'pattern 3' employing only second infrastructure.

In the case of 'pattern 1', two wireless infrastructures are activated at the same time and inter-cell interference is caused; however, in the case of 'pattern 2' or 'pattern 3', only one infrastructure is deactivated, thus interference in the remaining cells can have a channel state. One disadvantage should be noted that the number of data that can be sent at the same time is reduced from two to one for 'pattern 2' and 'pattern 3'.

In the conventional method, one service provider operates multiple wireless infrastructures and applies various means to avoid performance degradation due to interference among cells constructed by each wireless infrastructure. In this case, the inter-cell interference control is implemented through determining activation and deactivation of each wireless infrastructure at each time slot, namely through determining a pattern for each time slot.

In what follows, briefly introduced will be a method for controlling interference among cells constituting each wireless infrastructure according to the pattern method.

First, the following terms are defined for the convenience of description.

N: a set of wireless infrastructures or cells, may also means the number of the set of wireless infrastructures or cells.

S: a set of users, may also means the number of the set of users.

$S_n$: a set of users serviced in a wireless infrastructure n, may also means the number of the set of users serviced in a wireless infrastructure n.

P: a set of patterns, may also means the number of the set of patterns.

$N_P$: a set of wireless infrastructures activated according to pattern P.

$R_S(t)$: average transmission rate obtained by a user S up to time t.

$R_{S,P}(t)$: instantaneous transmission rate allowed for a user S at time t in the case of pattern P.

α: parameter meant for adjusting network efficiency and fairness among users.

β: constant required at the time of updating average transmission rate.

Algorithm for pattern selection and scheduling of users (terminals) within an AP region 1. The AP measures an instantaneous transmission rate $R_{S,P}(t)$ of the user for each pattern at the start of each time slot. And the AP informs a central node (CN) of the measured instantaneous transmission rate $R_{S,P}(t)$ or transmits $R_{S,P}(t)$ to the central node. It is common that the central node and AP are connected to each other wired but can also be connected to each other wirelessly.

2. The central node determines an optimal pattern p* through the following equation 1 among the patterns indicating on-off states of individual APs based on the instantaneous transmission rate of the user at each time slot.

$$p^* = \text{argmax} \sum_{n \in N_p} \left[ \max_{s \in S_n} \frac{r_{s,p}(t)}{[R_s(t-1)]^\alpha} \right] \quad \text{[Eq. 1]}$$

3. In the wireless infrastructure $n \in N_p$ activated according to pattern p*(t) determined through step 2, the user (or terminal) to be serviced is determined by the following equation 2.

$$S_n^* = \underset{s \in S_n}{\text{argmax}} \frac{r_{s,p}(t)}{[R_s(t-1)]^\alpha} \quad \text{[Eq. 2]}$$

4. Based on the result of step 3, average transmission rate $R_s(t)$ is updated according to the following equation 3.

$$R_s(t+1) = \begin{cases} (1-\beta)R_s(t) + \beta R_s(t) & \text{if } s = s_n^*(t) \\ (1-\beta)R_s(t) & \text{if } s = s_n^*(t) \end{cases} \quad \text{[Eq. 3]}$$

for $\forall s \in S_n, \forall n \in N$

5. After t=t+1, step 1 is resumed.

As retention of Wi-Fi networks is regarded to be strong competitiveness, APs for Wi-Fi networks are being installed competitively by wireless communication service providers such as SKT, KT, and LGT. Installation of APs is also getting much attention by wireless communication service providers since the existing cellular infrastructure alone cannot accommodate explosion of mobile traffic along with widespread of smart phones. Accordingly, many of mobile communication service providers have started installing a large number of APs, where APs are installed being overlapped in such areas as important hot spots.

Therefore, in those areas where radio coverage of APs overlaps with each other, performance degradation due to inter-cell interference in WLAN has come to the fore. In view of service providers, costs incurred due to thoughtless deployment of APs can be described by the situation where radio resources are scarcely available due to interference from neighboring APs in spite of costly installation of APs. In particular, it can be a problem if newly introduced APs installed by other service providers cause the aforementioned situation.

DISCLOSURE

Technical Problem

To solve the problem above, an object of the present invention is to guarantee as many radio resources as possible and evenly for individual APs employing common ISM band by assigning minimum guaranteed resource amount to each AP through weight information of APs and/or topology information among APs.

Technical Solution

In a method in which a upper layer entity allocates resources to a plurality of access points (APs) in a wireless access system including the plurality of APs and the upper layer entity for managing the plurality of APs, the method comprises sensing a change in minimum guaranteed resource amount allocated to each of the APs; acquiring, from each of the APs, AP-level topology information according to a degree of interference with adjacent APs and AP weight information given to each AP by a service provider; determining a minimum guaranteed resource amount for each of the APs based on the acquired AP-level topology information and AP weight information; and transmitting the determined minimum guaranteed resource amount to each of the APs.

Also, a change of the minimum guaranteed resource amount occurs when a new AP is added to the wireless access system or locations of the plurality of APs are changed.

A degree of interference with adjacent APs is determined by measuring frequency of appearance of links that can be recognized through carrier sensing of links between APs and comparing the measurement result with a predefined threshold.

In case the measurement result is larger than the threshold, interference is declared, whereas, in case the measurement is smaller than the threshold, it is determined that interference is not developed.

The minimum guaranteed resource amount for each of the APs is determined according to the following equation:

$$\Phi^{-CA} = \underset{\Phi}{\operatorname{argmax}} \sum_{m \in M} w_m \log(\Phi_m)$$

$$\text{s.t. } B\theta \geq \Phi, \sum \theta_i = 1 \text{ and } \theta_i \geq 0$$

where M denotes a set of the whole APs; B is IS matrix determined through the interference relationship among the APs; $w_m$ is a weight for AP m; and $\Phi_m$ is a solution to the above problem, which is the minimum resource to be guaranteed for AP m. $\theta_i$ denotes a time ratio of the i-th IS, which is larger than 0 and sum of which is 1.

In a method in which a upper layer entity guarantees minimum resources to an AP in a wireless access system including a plurality of upper layer entities for managing a plurality of APs and each of the APs individually, the method comprises sensing a change in minimum guaranteed resource amount allocated to the AP; acquiring information about the number of neighboring APs adjacent to the AP and weight information assigned to each of the neighboring APs; and based on the information about the number of the neighboring APs and weight information assigned to each of the neighboring APs, determining minimum guaranteed resource amount for the AP.

The method further comprises transmitting the determined minimum guaranteed resource amount to the AP.

The determining minimum guaranteed resource amount for the AP is carried out according to the following equation.

$$\Phi_m = \frac{w_m}{w_m + \sum_{n \in N(m)} w_m}$$

where $w_m$ is a weight for AP m, and N(m) is a set of APs adjacent to the AP m.

In a wireless access system including a plurality of APs and a upper layer entity for managing the plurality of APs, the upper layer entity for allocating resources to the plurality of APs, comprises a wireless communication unit for communicating wireless signals with external entities; and a controller connected to the wireless communication unit, where the controller controls the wireless communication unit to sense a change in minimum guaranteed resource amount allocated to each AP; acquire, from each of the APs, AP-level topology information according to a degree of interference with adjacent APs and AP weight information given to each AP by a service provider; determine a minimum guaranteed resource amount for each of the APs based on the acquired AP-level topology information and AP weight information; and transmit the determined minimum guaranteed resource amount to each of the APs.

Advantageous Effects

The present invention assigns unique weights to the individual APs so that minimum guaranteed resource amount can be allocated to each of the APs, thereby guaranteeing as many radio resources as possible and evenly for individual APs.

MODE FOR INVENTION

The technology described in this document can be applied to various wireless communication systems employing CDMA (Code Division Multiple Access), FDMA (Frequency Division Multiple Access), TDMA (Time Division Multiple Access), OFDMA (Orthogonal Frequency Division Multiple Access), or SC-FDMA (Single Carrier Frequency Division Multiple Access).

A CDMA system can be realized by such radio technology as UTRA (Universal Terrestrial Radio Access) or CDMA2000. A TDMA system can be realized by using such radio technology as GSM (Global System for Mobile communications), GPRS (General Packet Radio Service), or EDGE (Enhanced Data Rates for GSM Evolution). An OFDMA system can be realized by using IEEE 802.11 (Wi-Fi), IEEE 802.16 (WiMAX), or IEEE 802-20, or E-UTRA (Evolved UTRA). The IEEE 802.16m is an advanced form of the IEEE 802.16e, providing backward compatibility with those systems based on the IEEE 802.16e.

UTRA is part of UMTS (Universal Mobile Telecommunications System).

The 3GPP (3rd Generation Partnership Project) LTE (Long Term Evolution) specifications form part of the E-UMTS (Evolved UMTS) employing the E-UTRA (Evolved-UMTS Terrestrial Radio Access), employing OFDMA for downlink transmission while SC-FDMA for uplink transmission. The LTE-A (Advanced) is the advanced form of the 3GPP LTE.

In what follows, preferred embodiments according to the present invention will be described in detail with reference to appended drawings. In this document, the same reference number is assigned to the same or similar constituting element regardless of its symbol in the corresponding figure, and repeated description about the constituting element will be omitted. Also, if it is determined that specific descriptions about a technology known to the related field may obscures the technical principles of the present invention, detailed descriptions thereof will be omitted. The appended drawings are intended to help understanding of the technical principles of the present invention, and it should be understood that the technical principles of the present invention are not limited to the appended drawings. Also, it should be understood that the technical scope of the present invention is extended to include all of the possible modifications, equivalents, or substitutes, as well as what is indicated in the appended drawings.

Figure 1:
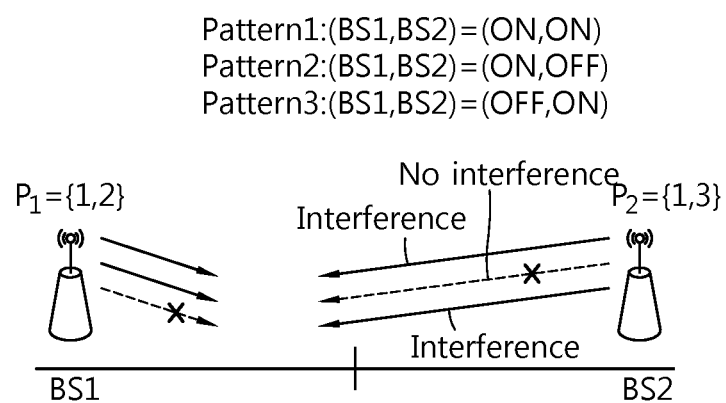
FIG. 1 illustrates a form of pattern control for controlling inter-cell interference in the case of two cells.
Figure 2:
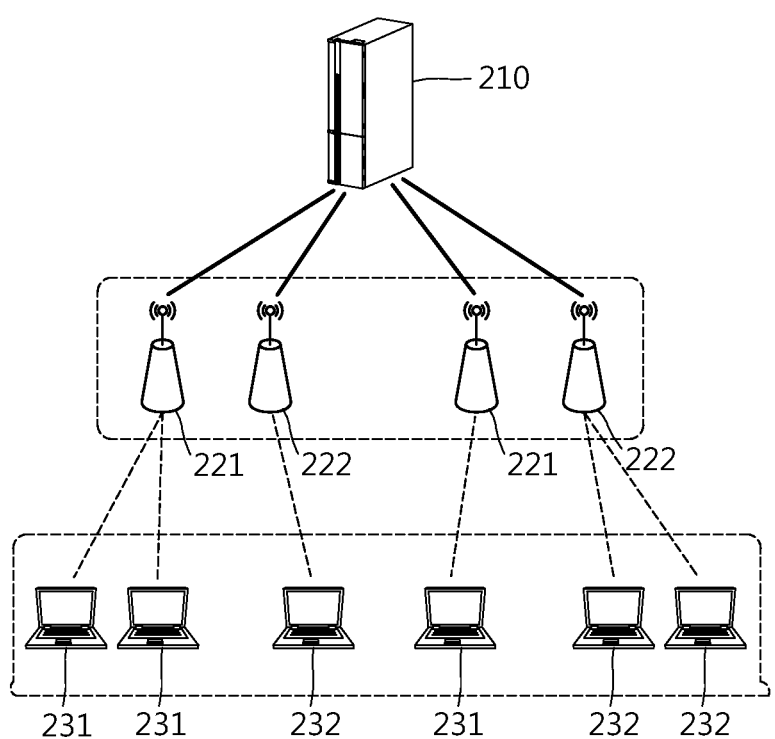
FIG. 2 illustrates a wireless access system to which one embodiment of the present invention can be applied.

FIG. 2 illustrates a wireless access system to which one embodiment of the present invention can be applied.

With reference to FIG. 2, the wireless access system comprises a central node (CN) 210, access points 221, 222, 223 and 224, and terminals (or users) 231, 232, 233, 234, 235 and 236.

The CN can be represented by such a term as a upper layer entity or management entity. Also, the CN can manage a plurality of APs 221, 222, 223 and 224 or one AP.

The CN 210 manages all of the APs 221, 222, 223 and 224 installed by various service providers. The CN manages the APs 221, 222, 223 and 224 for each time slot and determines which APs 221, 222, 223 and 224 to turn on or off based on the feedback information from the APs 221, 222, 223 and 224. The feedback information carries channel state information of APs 221, 222, 223 and 224, channel state information among terminals belonging to the coverage of the APs 221, 222, 223 and 224 or location information of the APs 221, 222, 223 and 224.

In this document, the on-off state of an AP is called a pattern.

An AP 220 is connected to the CN wired or wirelessly and connected wirelessly to the terminals 231, 232 within coverage of the AP. The APs can be grouped according to wireless communication service providers. In other words, as shown in FIG. 2, the APs with the same symbol belong to the same group managed by the same service provider 221, 222.

An AP 221 is connected to the CN wired or wirelessly and connected wirelessly to the terminals 231, 232 within coverage of the AP. The APs 221, 222, 223 and 224 can be grouped according to wireless communication service providers. In other words, as shown in FIG. 2, the APs 221 and 223 and the APs 222 and 224 with the same symbol belong to the same group managed by the same service provider.

Each AP 221, 222, 223 or 224 has users (or terminals 231, 232, 233, 234, 235 or 236) communicating with the AP 221, 222, 223 or 224; each user 231, 232, 233, 234, 235 or 236 measures channel conditions to utilize time varying radio resources in an efficient manner and provides the measured channel condition information to the AP 221, 222, 223 or 224 as feedback information.

Therefore, the information provided from the APs 221, 222, 223 and 224 to the CN corresponds to the collection of information about channel conditions of the users 231, 232, 233, 234, 235 and 236 for whom each individual AP provides communication services.

As shown in FIG. 2, two APs 221, 222 belong to one service provider while there are other two Aps 223, 224 belonging to another service provider. One central node 210 determines a pattern according to which the APs are turned on or off at each time slot. The AP 223 provides a communication service to users 231, 232; the AP 223 to a user 234; the AP 222 to a user 233; and the AP 224 to users 235, 236; therefore, the APs 221, 222, 223 and 224 turned on at each time slot can perform scheduling of their communication services by selecting one of the users 231, 232, 233, 234, 235 and 236 to whom the communication services are provided.

Figure 3:
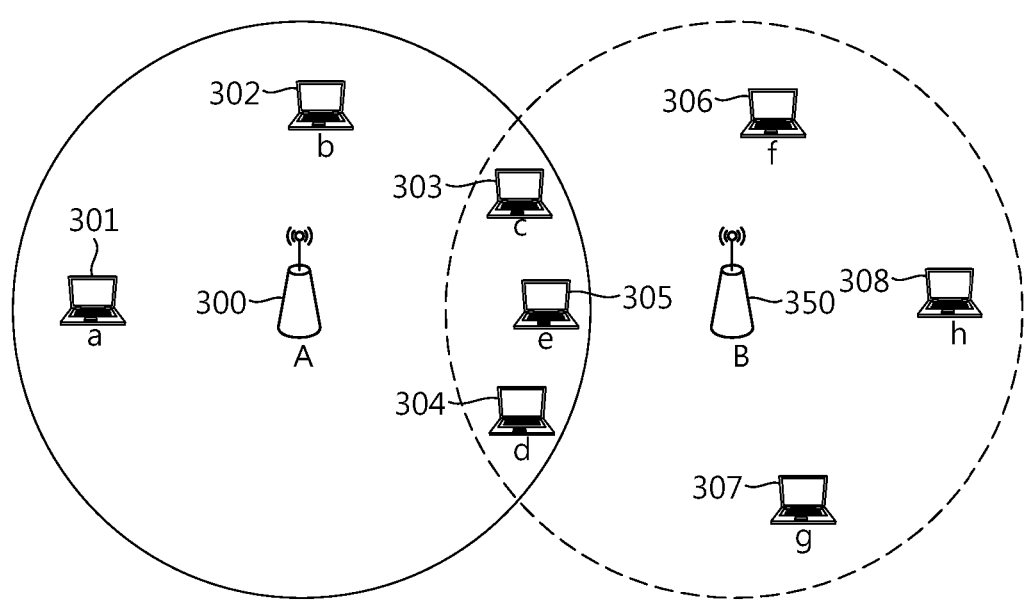
FIG. 3 shows a topology of two cells illustrating an example of a method for finding a ratio of target time of each pattern based on pattern preference.

FIG. 3 shows a topology of two cells illustrating an example of a method for finding a ratio of target time of each pattern based on pattern preference.

With reference to FIG. 3, the AP A belongs to a service provider A 300, and the AP B 350 belongs to a service provider B. Users receiving a communication service from the cell A include a 301, b 302, c 303, and d 304; user c 303 and d 304 who are currently staying in an overlapping area receive interference from the cell B. Users receiving a communication service from the cell B include e 305, f 306, 007, and h 308; user e 305 who is currently staying in an overlapping area receives interference from the cell A. In the topology of FIG. 3, for the sake of brevity, a transmission rate is marked as '1' or '0' only to reflect the existence of interference, where '1' represents the case of no interference while '0' represents the opposite case.

A method for finding a ratio of target time of each pattern based on pattern preference through the topology of FIG. 3 will be described later.

In what follows, described in detail will be a method for service scheduling for users to control interference among the cells formed by APs on the basis of pattern preference, pattern selection, and particular pattern.

First, the present invention does not force to use fewer resources than the maximum resources available in an attempt to reduce interference on the APs of different service providers in view of network service providers to avoid performance degradation due to interference;

First, the present invention proposes a new criterion called a contract among service providers and performs interference control based on the contract rather than blindly force the wireless access system to use the maximum resource available sparingly to reduce interference on the APs belonging to different service providers and to avoid performance degradation due to the interference in view of network service providers.

In other words, the central node determines a pattern for each AP, describing at which time slot the corresponding AP turns on or off. To this end, the present invention introduces a concept of pattern preference and enables interference control based on a contract.

Through determination of a pattern, not only the contract relationship but also a degree of interference causing deterioration of neighboring cells can be taken into account; therefore, when and how long each AP is turned on is determined. A degree of interference causing deterioration of neighboring cells can be understood from an example situation; while two APs are operating normally without causing inference on each other, if an AP is newly installed between the two APs, the newly introduced AP undermines the two APs. On the other hand, the existing two APs exert influence only on the newly introduced AP. Thus it is reasonable that the newly introduced AP should pay the penalty in proportion as it causes interference on the two APs. This may be realized such that the newly introduced AP is made to be turned on for a smaller time period. In this case, the service provider operating the newly introduced AP may pay the penalty of causing interference on its neighboring cells through a higher contract price or may just operate the newly introduced AP with penalty.

Figure 4:
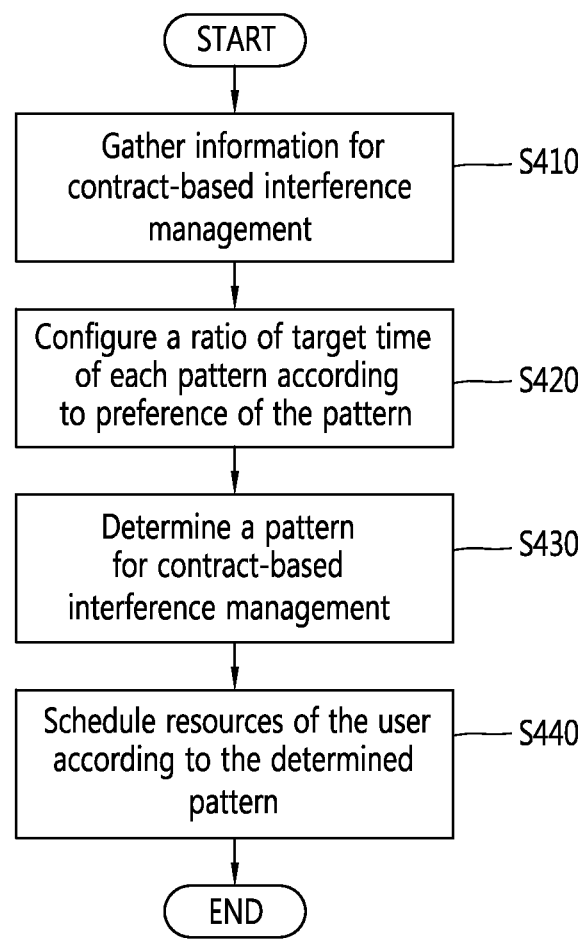
FIG. 4 is a flow diagram illustrating a method for inter-cell interference control.

FIG. 4 is a flow diagram illustrating a method for inter-cell interference control.

First, the central node and/or APs collate information for contract-based interference management S410. In other words, the central node gathers feedback information from each AP, and each AP gathers feedback information from terminals (or users) within the coverage of each AP.

Each AP gathers channel information about individual users within its coverage. In other words, each AP 221, 222 measures radio channel information of the users 231, 232 associated with the AP.

Also, the central node gathers information from each individual AP. In other words, each individual AP 221, 222 informs the central node 210 determining interference management about information required for the interference management. The information required for interference management may be channel information of the AP and individual users within its coverage or location information of the AP.

Afterwards, the central node, based on preference of each pattern, configures (or determines) a ratio of target time for the pattern S420.

In other words, the central node, based on pattern preference defined as follows, configures a ratio of target time for each pattern to perform interference management containing a degree of interference among APs and a contract relationship among service providers according to the degree of interference.

Described later will be a method for the central node to select a pattern, by which each AP allocates radio resources to the users in an efficient manner while keeping the ratio of target time of each pattern configured as described above, and a scheduling method for resource allocation of each AP.

In what follows, terms used for calculating pattern preference are defined.

$l_p^s$: Preference of a user S for pattern p.
$l_p^n$: Preference of an AP n for pattern p.
$l_p^g$: Preference of a wireless communication service provider g for pattern p
$l_p$: Preference of a wireless network for pattern p
$r_{s,p}$: Average transmission rate obtained when the user s selects pattern p.
$\mu_p$: The number of APs turned on according to pattern p
Calculation of preference for each pattern is carried out as follows.

1. Calculate preference of each user (or terminal) for each pattern $$l_p^s = \begin{cases} 1, & \text{if } p = \mathrm{argmax}\, r'_{s,p}\mu_p, \\ 0, & \text{otherwise,} \end{cases} \text{ for } \forall\, p \in P, \forall\, s \in S \qquad [\text{Eq. 4}]$$

In the topology of FIG. 3, in case $r_{s,p}$, is determined to be 0 or 1 depending on existence of interference, pattern preference of the users can be summarized as shown in Table 1.

TABLE 1

| User | Whether to transmit or not | | | Preference |
|---|---|---|---|---|
| | Pattern 1 | Pattern 2 | Pattern 3 | |
| a | ○ | ○ | X | Pattern 1 ($l_1^a = 1$) |
| b | ○ | ○ | X | Pattern 1 ($l_1^b = 1$) |
| c | X | ○ | X | Pattern 2 ($l_2^c = 1$) |
| d | X | ○ | X | Pattern 2 ($l_2^d = 1$) |
| e | X | X | ○ | Pattern 3 ($l_3^e = 1$) |
| f | ○ | X | ○ | Pattern 1 ($l_1^f = 1$) |
| g | ○ | X | ○ | Pattern 1 ($l_1^g = 1$) |
| h | ○ | X | ○ | Pattern 1 ($l_1^h = 1$) |

2. Calculate preference of each AP for each pattern $$l_p^n = \frac{\sum_{s \in S_n} l_p^s}{S_n}, \text{ for } \forall p \in P, \forall n \in N \quad [\text{Eq. 5}]$$

In the topology of FIG. 3, in case $r_{s,p'}$ is determined to be 0 or 1 depending on existence of interference, pattern preference of the APs can be summarized as shown in Table 2.

TABLE 2

| provider | pattern 1 | pattern 2 | pattern 3 |
|---|---|---|---|
| A | $l_1^A = 1$ | $l_2^A = 1$ | $l_3^A = 0$ |
| B | $l_1^B = 0.75$ | $l_2^B = 0$ | $l_3^B = 0.25$ |

3. Calculate pattern preference of each service provider $$l_p = \sum_{g \in G} l_p^g, \text{ for } \forall p \in P \quad [\text{Eq. 6}]$$

In the topology of FIG. 3, in case $r_{s,p'}$ is determined to be 0 or 1 depending on existence of interference, and the contract relationship between a service provider A and B is 2:1, pattern preference of the service providers can be summarized as shown in Table 3.

TABLE 3

| provider | pattern 1 | pattern 2 | pattern 3 |
|---|---|---|---|
| A | $l_1^A = 1$ | $l_2^A = 1$ | $l_3^A = 0$ |
| B | $l_1^B = 0.75$ | $l_2^B = 0$ | $l_3^B = 0.25$ |

4. Calculate pattern preference in the whole network $$l_p = \sum_{g \in G} l_p^g, \text{ for } \forall p \in P \quad [\text{Eq. 7}]$$

TABLE 4

| pattern 1 | pattern 2 | pattern 3 |
|---|---|---|
| $l_1 = 1.75$ | $l_2 = 1$ | $l_3 = 0.25$ |

5. Based on pattern preference of the whole network, calculate a ratio of target time of each pattern The ratio of target time for each pattern $\theta_p^*$ is defined as shown in Eq. 8.

$$\theta_p^* = \frac{l_p}{\sum_{g \in G} l_p} \quad [\text{Eq. 8}]$$

In the topology of FIG. 3, in case $r_{s,p'}$ is determined to be 0 or 1 depending on existence of interference, and the contract relationship between a service provider A and B is 2:1, a ratio of target time of each pattern is represented as show below.

$$\theta_1^* = \frac{7}{12}, \theta_2^* = \frac{1}{3}, \theta_3^* = \frac{1}{12}$$

Calculation of pattern preference described above can be simplified through the method as shown below (1 to 2).

1. Pattern preference of an AP can be determined by estimating an approximate degree of interference among APs on the basis of location information of the APs, instead of using preference of users receiving a communication service from the existing APs. Through this method, a procedure of gathering pattern preference of users for each pattern can be omitted.

2. As a pattern is defined by on-off states for the corresponding AP, the total number of patterns increases a lot as the number of AP is increased. To reduce the degree of complexity increasing according as preference for such patterns is examined, a different definition for the pattern can be used. That is, instead of defining the pattern as a set of states for individual APs to be turned on or off according thereto, in a new definition of pattern, all of the APs belonging to a particular service provider are turned on or off simultaneously, thereby reducing the number of patterns considerably.

In the same way as the step 2, to prevent the number of patterns from getting larger as the number of APs increases, the number of central nodes is increased and APs constituting the whole network are divided into several small groups. The central node of each group calculates pattern preference independently of central nodes of other groups, thereby simplifying calculation of the pattern preference.

Afterwards, the central node selects (or determines) a pattern meant for contract-based inter-cell interference management S430, and according to the selected pattern, the corresponding AP schedules resources of each user S440.

In what follows, a pattern selection (or determination) method and a resource scheduling method for a user will be described in detail.

The central node selects a pattern for each time slot. The selected pattern is used to determine which AP to turn on or off. Next, APs receives the selected pattern from the central node. When the AP is turned on according to the selected pattern, the AP chooses users who will receive communication services from the AP.

First of all, a few terms are defined as follows.

$\theta_p^*$: A ratio of target time of pattern p max $q_p^{max}$: A virtual queue for preventing the pattern p from getting larger than the ratio of target time $q_p^{min}$: A virtual queue for preventing the pattern p from getting smaller than the ratio of target time A method for pattern selection by a central node and a resource scheduling method for the user of an AP according to the selected pattern will be described below.

(1) An AP measures an instantaneous transmission rate $r_{s,p}(t)$ of the user according to each pattern at the start of each time slot and transmits the measurement result to a central node.

(2) The central node, based on the instantaneous transmission rate of the user received through the step (2), determines a pattern indicating an on-off state of the AP for each time slot by using the following equation 9.

$$p^* = \operatorname*{argmax}_{n \in N_p} \left[ \max_{s \in S_n} \frac{r_{s,p}(t)}{[R_s(t-1)]^\alpha} + \beta(q_p^{min}(t-1) - q_p^{max}(t-1)) \right] \quad \text{[Eq. 9]}$$

(3) The AP n (n∈Np) to be activated according to the pattern p*(t) obtained through Eq. 9 determines the users for whom to provide communication services by using Eq. 10 as follows.

$$S_n^*(t) = \operatorname*{arg\,max}_{s \in S_n} \frac{r_{s,p}(t)}{[R_s(t-1)]^\alpha} \quad \text{[Eq. 10]}$$

(4) Based on the result from Eq. 10, the AP updates an average transmission rate R(t) for each user according to Eq. 11.

$$R_s(t+1) = \begin{cases} (1-\beta)R_s(t) + \beta R_s(t) & \text{if } s = s_n^*(t) \\ (1-\beta)R_s(t) & \text{if } s \neq s_n^*(t) \end{cases} \text{for } \forall s \in S_n, \forall n \in N \quad \text{[Eq. 11]}$$

(5) Based on the result of the step (3), the AP updates a virtual queue according to Eqs. 12 and 13.

$$q_p^{min} = \begin{cases} [q_p^{min}(t-1) - 1]^+ + \theta_p^* & \text{if } p = P*(t) \\ q_p^{min}(t-1) + \theta_p^* & \text{otherwise,} \end{cases} \text{for } \forall p \in P \quad \text{[Eq. 12]}$$

$$q_p^{max} = \begin{cases} [q_p^{max}(t-1) - \theta_p^*]^+ + 1, & \text{if } p = P*(t) \\ [q_p^{max}(t-1) - \theta_p^*]^+, & \text{otherwise} \end{cases} \text{for } \forall p \in P \quad \text{[Eq. 13]}$$

After the step (6), the step (1) is resumed, and the steps (1) to (5) are repeated.

At this time, a scheduling method for the AP to allocate resources to each terminal can be carried out as follows.

First, the AP transmits its queue information to each terminal. Here, the queue denotes a virtual queue with a upper bound. Minimum guaranteed resources are allocated to the AP from the central node.

Next, the AP receives link rate-related information from each terminal. The link rate control can be carried out according to Eq. 14 below.

$$r_l = \frac{w_l}{q_l - \mu_m} \quad \text{[Eq. 14]}$$

where $r_l$ represents a link rate and $w_l$ represents a link weight.

Afterwards, the AP performs scheduling of resource allocation for each terminal according to link rate-related information received from each terminal. In other words, the AP updates a queue corresponding to each terminal. In this case, the scheduling can employ Q-based adaptive CSMA method.

Meanwhile, the pattern selection performed by the central node as described above can be simplified by using a method below.

In other words, the simplified method does not employ the algorithm based on an instantaneous transmission rate of the users for each time slot, where the instantaneous transmission rate uses a virtual queue and resources in an efficient manner to satisfy a target ratio of the predetermined pattern as described in the step (2). Rather, the simplified method predetermines the order of patterns in a round-robin fashion so that the ratio of target time $\theta_p^*$ can be satisfied for each time slot by absolutely following the order.

For example, in case the ratio of target time for 'pattern 1' is 0.5 and that for 'pattern 2' is 0.5, the central node can determine the order of patterns like "pattern 1→pattern 2→pattern 1→pattern 2→pattern 1→pattern 2→pattern 1→pattern 2→pattern 1 . . . ".

As another example, in case the ratio of target time for 'pattern 1' is 0.25 and that for 'pattern 2' is 0.75, the central node can determine the order of patterns like "pattern 1→pattern 2→pattern 2→pattern 2→pattern 1→pattern 2→pattern 2→pattern 2→pattern 1 . . . ".

Determination of Minimum Guaranteed Resource Amount for APs

In what follows, described will be a method for allocating (or determining) minimum guaranteed resource amount of an AP according to the present invention. The method is intended to prevent performance degradation of an AP due to interference caused from other APs installed by a different service provider and to share radio resources in an appropriate manner.

First, the following conditions need to be met to determine minimum guaranteed resource amount of an AP.

1. A management entity configures minimum guaranteed resources for APs. The management entity is installed in each individual AP or implemented in the form of a server.

2. Each AP can sense neighboring APs in its surroundings through a packet broadcast.

3. Each AP can satisfy minimum guaranteed resources configured by the management entity and know how many resources it currently occupies.

Figure 5:
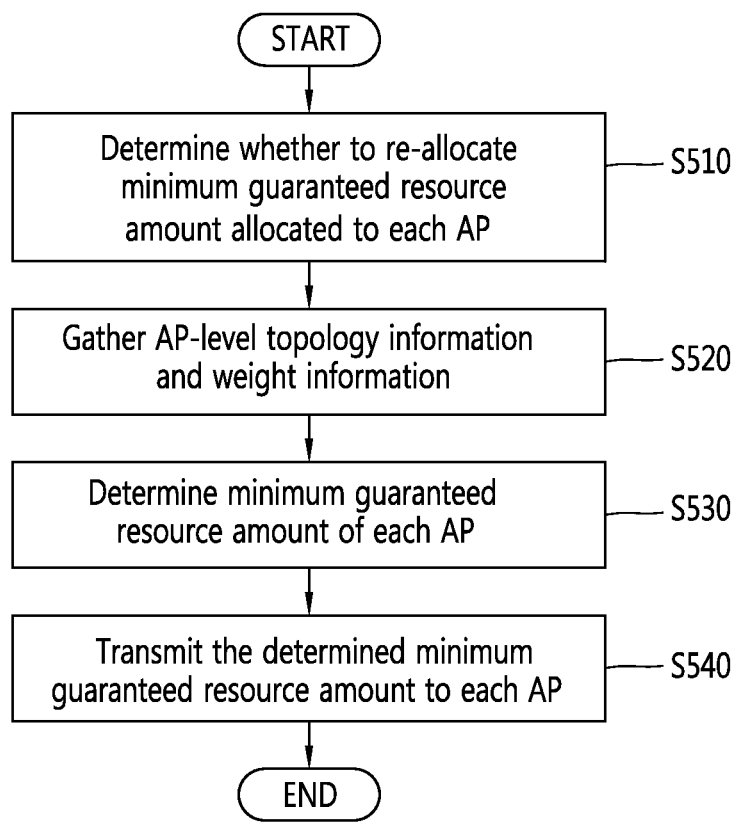
FIG. 5 is a flow diagram illustrating a method for determining minimum guaranteed resource amount of an AP according to one embodiment of the present invention.

FIG. 5 is a flow diagram illustrating a method for determining minimum guaranteed resource amount of an AP according to one embodiment of the present invention.

In other words, FIG. 5 illustrates a method for determining minimum guaranteed resource amount for each AP in case there is a management entity which manages the whole APs.

First, a upper layer entity (namely, a management entity) determines whether to re-allocate (or determine again) the minimum guaranteed resource amount allocated to each AP S510. At this time, in case a change of the minimum guaranteed resource amount allocated to each AP is sensed, the upper layer entity determines again the minimum guaranteed resource amount for each AP. Also, the upper layer entity refers to a subject managing each AP and can be implemented in the form of a server.

Also, a change of the minimum guaranteed resource amount allocated to each AP can occur when a new AP is installed; when locations of the existing APs are changed; or when weights assigned to individual APs are changed.

Afterwards, in case a change of the minimum guaranteed resource amount for each AP is sensed, the upper layer entity gathers AP-level topology information and weight information S520. Here the AP-level topology information depends on a degree of interference between the AP and its neighboring APs while the weight information refers to a weight assigned to each AP by the corresponding service provider.

The upper layer entity can figure out the interference relationship at the AP-level through the topology information and weight information.

At this point, the interference relationship usually refers to the case where two links cannot perform transmission simultaneously. Extending this definition up to the AP-level, an interference relationship at the AP-level can be defined to describe the case where two APs cannot provide communication services at the same time. According to the AP-level interference relationship, feasibility of the minimum guaranteed resource amount is determined. The AP-level interference relationship will be described in more detail with reference to FIG. 7.

Next, the upper layer entity determines the minimum resource amount to be guaranteed by each AP based on the gathered AP-level topology information and weight information S530. The minimum guaranteed resource amount in this case is determined according to Eq. 15. In other words, the minimum guaranteed resource amount can be determined for each AP in a fair and efficient manner through Eq. 15.

$$\Phi^{-CA} = \underset{\Phi}{\operatorname{argmax}} \sum_{m \in M} w_m \log(\Phi_m) \text{ s.t.} B\theta \geq \Phi, \quad [\text{Eq. 15}]$$

$$\sum \theta_i = 1$$

and $$\theta_i \geq 0$$

where M represents a set of the whole APs; B is IS matrix found through an interference relationship among the APs; wm is a weight of AP m; and Φm is a solution to the Eq. 15 and represents the minimum amount of resources that need to be guaranteed for the AP m. θi represents a time ratio of the i-th IS, which has a value of 0 or more and the sum of the whole θi is 1.

Also, the CA denotes Centralized Allocation.

Next, the upper layer entity transmits the determined minimum guaranteed resource amount to each AP S540.

In other words, as described above, the minimum guaranteed resource amount of each AP is determined depending on the weight of the AP assigned by the corresponding service provider and a degree of interference with neighboring APs according to the installation location of the AP.

As the weight for an AP becomes smaller or as the AP is installed in an area highly populated with other APs, fewer resources are guaranteed. Similarly, higher feasibility guarantees fewer resources for the AP; in case the feasibility value changes into a range of unfeasible operation or communication services are made unavailable in actual environments, the minimum guaranteed resource amount can be adjusted to be fair for the APs involved.

Figure 6:
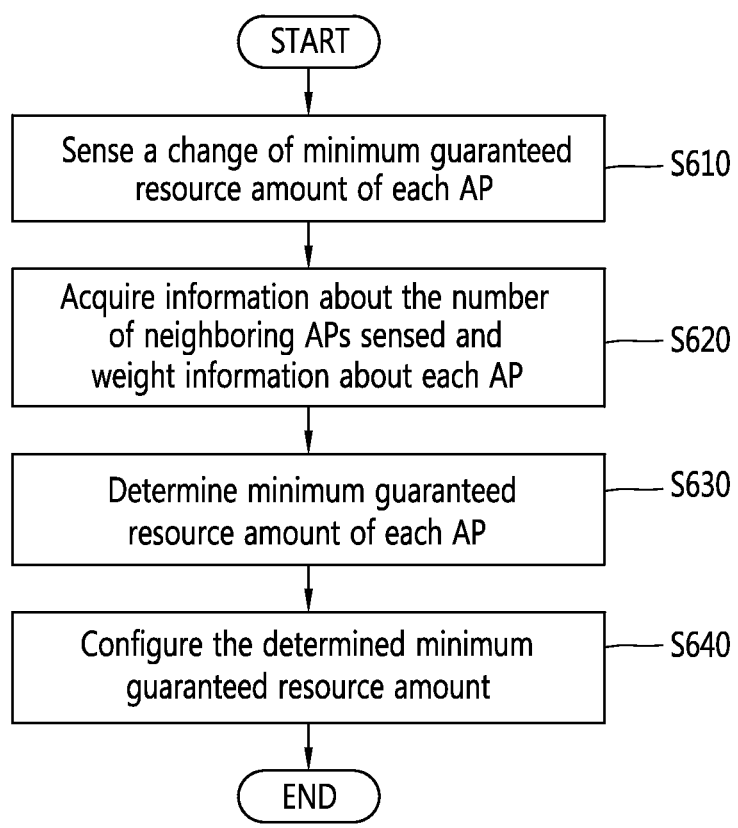
FIG. 6 is a flow diagram illustrating a method for determining minimum guaranteed resource amount of an AP according to another embodiment of the present invention.

FIG. 6 is a flow diagram illustrating a method for determining minimum guaranteed resource amount of an AP according to another embodiment of the present invention.

In other words, FIG. 6 illustrates a method for determining the minimum guaranteed resources of each AP in case there is no management entity which manages the whole APs.

Now it is assumed that a upper layer entity managing APs, namely, a management entity is installed in each AP.

Determination of the minimum guaranteed resource amount according to the embodiment of FIG. 6 is similar to the process of determining the minimum guaranteed resource amount shown in FIG. 5; the embodiment of FIG. 6, however, requires additional operation because of lack of gathered information.

First of all, the upper layer entity senses(or detects) a change of the minimum guaranteed resource amount of the APs managed by the upper layer entity S610. A change of the minimum guaranteed resource amount allocated to the AP can occur when a new AP is sensed around the AP; when location of the AP is changed; or when information is received indicating that weights of neighboring APs including the AP have been changed.

Afterwards, the upper layer entity, after sensing a change of the minimum guaranteed resource amount of the AP, checks the number of APs sensed around its surroundings to determine a new minimum guaranteed resource amount for the AP and obtains weight information of sensed neighboring APs through a message S620.

Next, the upper layer entity determines the minimum resource amount to be guaranteed for each AP according to the following equation 16 based on the information about the number of neighboring APs and weight information of the neighboring APs S630.

$$\Phi_m = \frac{w_m}{w_m + \sum_{n \in N(m)} w_m} \quad [\text{Eq. 16}]$$

where $w_m$ is a weight of AP m, and N(m) is a set of APs adjacent to the AP m. A deciding factor of whether an AP belongs to the N(m) is based on non-zero probability of interference and magnitude of the interference larger than a threshold in the same way as Eq. 15. In other words, if a non-zero probability of interference exists between the AP m and a particular AP, and the magnitude of the interference is larger than a particular threshold, the particular AP is regarded as a neighboring AP of the AP m.

Next, the upper layer entity makes the AP to configure the minimum guaranteed resources with the minimum guaranteed resource amount determined S640. In other words, the upper layer entity transmits the determined minimum guaranteed resource amount to the AP.

Definition of AP-Level Interference Relationship

Figure 7:
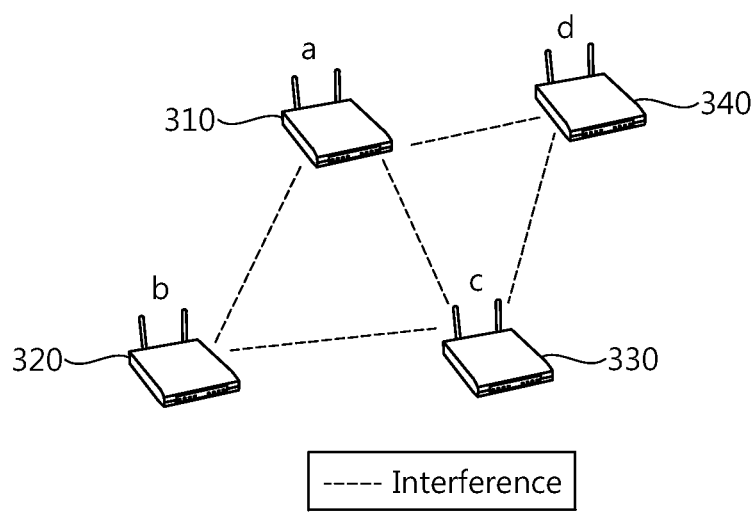
FIG. 7 shows a topology of APs illustrating an AP-level interference relationship according to one embodiment of the present invention.

FIG. 7 shows a topology of APs illustrating an AP-level interference relationship according to one embodiment of the present invention.

Usually, interference between links refers to the case where two links are unable to transmit data at the same time. An interference relationship between APs, however, is not defined conveniently.

If the interference relationship is not established among APs, there can be a problem in allocating resources to individual APs in a fair and efficient manner. Therefore, in what follows, a simple method for solving the problem will be described.

Interference among APs may or may not be developed depending on the distribution of locations of users (or terminals) of the APs. Since it is generally difficult to determine the minimum guaranteed resources for an AP while considering even the locations of the users, a probability of interference between two APs is measured in an average sense. This can be done by counting multiple occurrences of sensible links belonging to each individual AP through carrier sensing.

If the measured probability of interference is higher than a threshold, it can be decided that there exists interference among the APs whereas it is decided that no interference is developed in the opposite case. In this case, the threshold is the value predetermined or defined by the upper layer entity.

In other words, each of the APs is described in either of two ways, namely, depending on whether it is exerting interference or not.

As shown in FIG. 7, the interference information among APs indicates that AP b 720 interferes with AP a 710 and AP c 730, but does not interfere with AP d. In this case, AP b 720 and AP d 740, which are deemed to be free from interference, can be turned on simultaneously. Then the independent set (IS), which illustrates possible combinations of APs that can be turned on simultaneously, can be represented in a matrix form as shown in Eq. 17.

$$B = \begin{bmatrix} 1 & 0 & 0 \\ 0 & 1 & 0 \\ 0 & 0 & 1 \\ 0 & 1 & 0 \end{bmatrix} \quad [\text{Eq. 17}]$$

From Eq. 17, the first column of matrix B represents an independent set (IS). The first row (1 0 0) represents interference level of AP a; the second row (0 1 0) AP b 720; the third row (0 0 1) AP c 730; and the fourth row (0 1 0) AP d 740.

Therefore, the upper layer entity can determine the minimum guaranteed resources for each AP according to Eq. 15 or 16 by using the information above.

As the threshold used to decide interference between two APs is set to a higher value, feasibility of the minimum guaranteed resources for each AP gets higher in proportion to the threshold. The minimum guaranteed resource for the AP itself is then made to have a lower value, however. On the other hand, if the threshold is set to a lower value, chances are that the minimum guaranteed resource value will become infeasible; however, the minimum guaranteed resource for the AP can be made to be higher.

The feasibility problem such as the above can be prevented when the threshold is set to '1'; if the threshold is set to a value smaller than '1' to obtain higher guaranteed resources, the minimum guaranteed resource, which is calculated by using the probability of (1-threshold), is made to be infeasible.

In case the upper layer entity allocates minimum guaranteed resources to APs, which may not be executed with a probability of (1-threshold), there is the chance of unfair allocation that only fewer resources are allocated to a particular AP while two APs compete with each other for resources. At this time, if the AP finds during monitoring of allocated resources that it has to use fewer resources, the AP makes the minimum guaranteed resources of the AP itself and neighboring APs having an interference relationship with the AP scaled down through the management entity or by delivering a message to the neighboring APs.

If the APs, which have been scaled down more than a predetermined time period, satisfy the minimum guaranteed resources, the upper layer entity can make the APs return to have the original minimum guaranteed resources.

Figure 8:
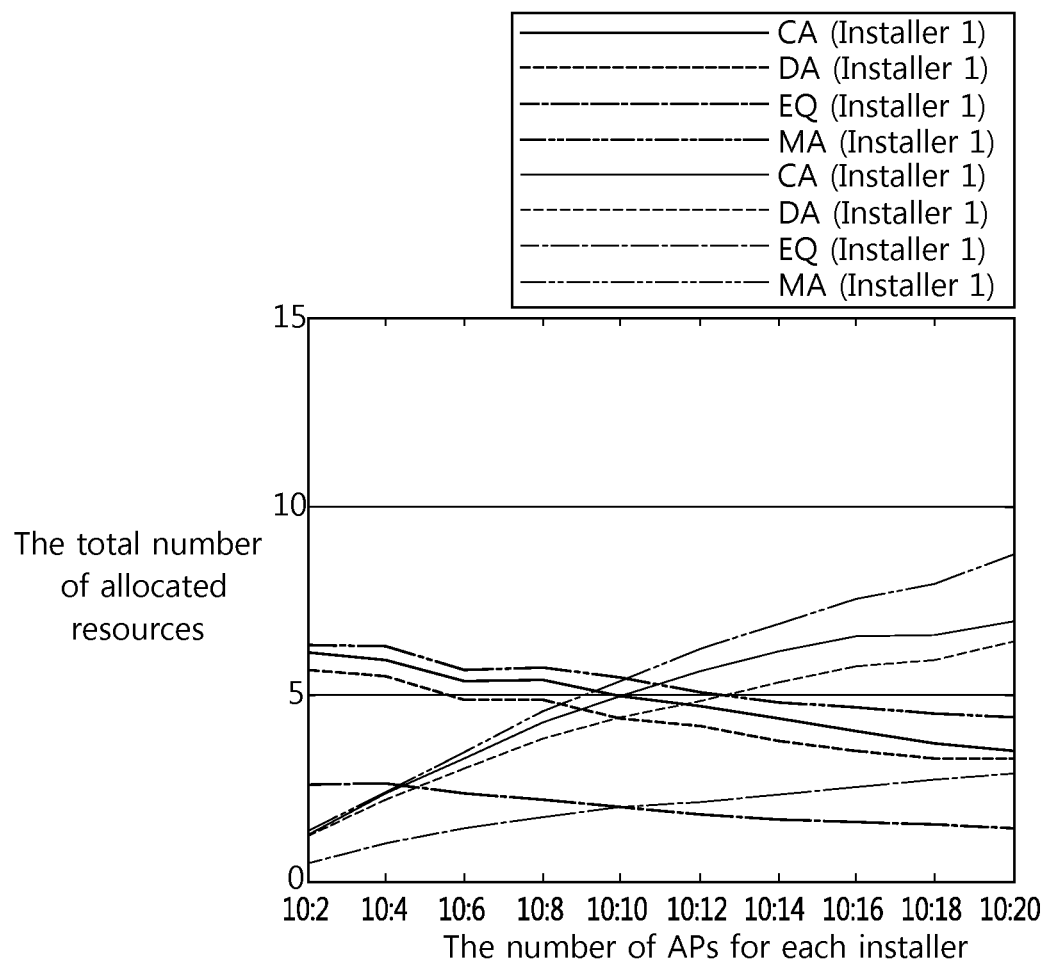
FIG. 8 is a graph of the total allocated resources according to the number of installed APs for each service provider, obtained from a method for determining minimum guaranteed resource amount of an AP according to the present invention.

FIG. 8 is a graph of the total allocated resources according to the number of installed APs for each service provider, obtained from a method for determining minimum guaranteed resource amount of an AP according to the present invention.

FIG. 8 shows the result obtained from a simulation performed 100 times with the following assumptions—two installers, area size of 300 m×300 m, communication range of 50 m, and random distribution of APs.

The x-axis of FIG. 8 represents a ratio between the number of APs of the two installers, and y-axis represents the total number of allocated resources.

In the graph of FIG. 8, CA (Centralized Algorithm) is a method of determining resources of each AP based on the whole information proposed by the present invention; DA (Distributed Algorithm) is a method of determining resources of each AP based on local information that can be obtained by the corresponding AP; EQ (Equal Allocation) is a method taking account of only fairness of resource allocation; and MA (Maximum Allocation) considers only efficiency.

As shown in FIG. 8, resources can be allocated to the respective service providers in proportion to the number of APs, which, in this example, the resources are allocated in the following order: EQ<DA<CA<MA.

Figure 9:
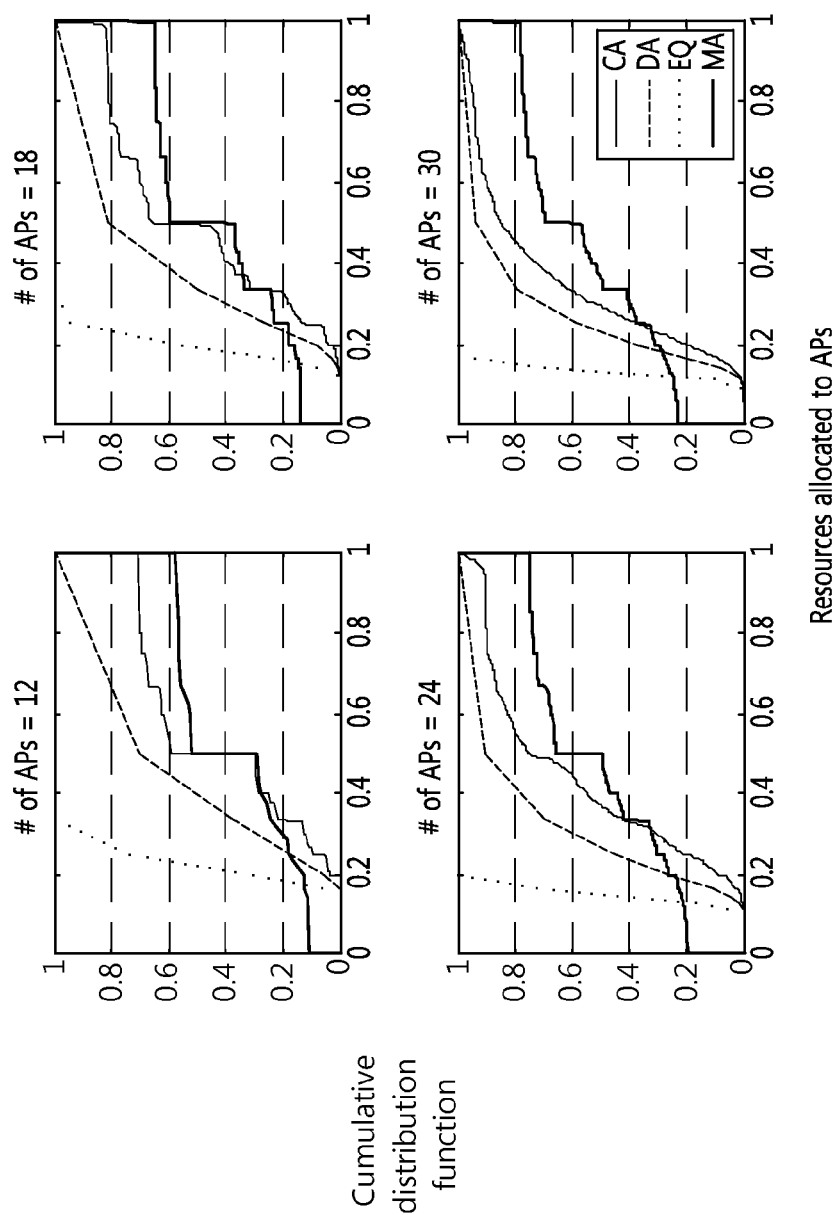
FIG. 9 shows graphs illustrating a relationship between the number of APs and minimum guaranteed resource amount of each AP when a method according to the present invention is applied.

FIG. 9 shows graphs illustrating a relationship between the number of APs and minimum guaranteed resource amount of each AP when a method according to the present invention is applied.

Shown in FIG. 9 are the CDFs (Cumulative Distribution Functions) of the minimum guaranteed resources for each AP according to the number of randomly distributed APs (namely, 12, 18, 24, and 30 APs) when each of the CA, DA, EQ, and MA is applied.

As FIG. 9 shows, in the case of MA which considers only efficiency, minimum guaranteed resources allocated to the APs of 0.1 to 0.22 become 0, which makes the MA algorithm a unfair method. The MA algorithm makes a more number of APs confront the same circumstances as an area in question becomes more crowded with APs. On the other hand, in the case of EQ, the APs generally have fewer minimum guaranteed resources. In the case of CA or DA, however, which is proposed by the present invention, no AP is made to have zero minimum guaranteed resources, and at the same time, a high value is assigned to the minimum guaranteed resources.

As another example, by controlling the method of configuring a weight for each AP, expected gains of service providers can be lowered, and by so doing, thoughtless development of Wi-Fi networks can be limited.

The above statement can be further illustrated by a scenario as shown in Table 5.

TABLE 5

|  | case 1 (proportional division) | | case 2 (Equal division) | |
| --- | --- | --- | --- | --- |
|  | weight of APs | Allocated resource | weight of APs | Allocated resource |
| Provider 1 | 1 | M/(M + N) | 1/M | 0.5 |
| Provider 2 | 1 | M/(M + N) | 1/N | 0.5 |
|  | Competitive Installation | | Only one installation | |

Table 5 assumes two service providers, each having M and N APs in single collision area. In this scenario, provider behavior is determined by a weight policy.

The embodiments and their modifications described above can be combined in various ways. Therefore, each embodiment can be implemented either alone or in combination of the embodiments depending on the needs. It should be clearly understood by those skilled in the art that such combinations can be implemented easily; therefore, the combinations will not be described in detail below. Although specific descriptions of the combinations are not provided, it should be understood that they are not excluded from the technical scope of the present invention, but belong to the technical scope of the present invention.

The embodiments and their modifications described above can be implemented through various means. For example, embodiments of the present invention can be implemented by hardware, software, or a combination thereof.

In the case of hardware implementation, methods according to the embodiments of the present invention can be implemented by one or more ASICs (Application Specific Integrated Circuits), DSPs (Digital Signal Processors), DSPDs (Digital Signal Processing Devices), PLDs (Programmable Logic Devices), FPGAs (Field Programmable Gate Arrays), processors, controllers, microcontrollers, microprocessors, and the like.

In the case of firmware or software implementation, methods according to the embodiment of the present invention can be implemented in the form of a module, procedure, or function carrying out operations described above. Software codes can be stored in a memory unit and executed by a processor. The memory unit, being located inside or outside the processor, can communicate data with the processor through various means known in the fields of the art.

For example, methods according to the present invention can be stored in a storage medium (for example, internal memory, flash memory, hard disk, and the like); and can be implemented by codes or commands within a software program that can be executed by the processor (for example, microprocessor). This type of implementation will be described with reference to FIG. 10.

Figure 10:
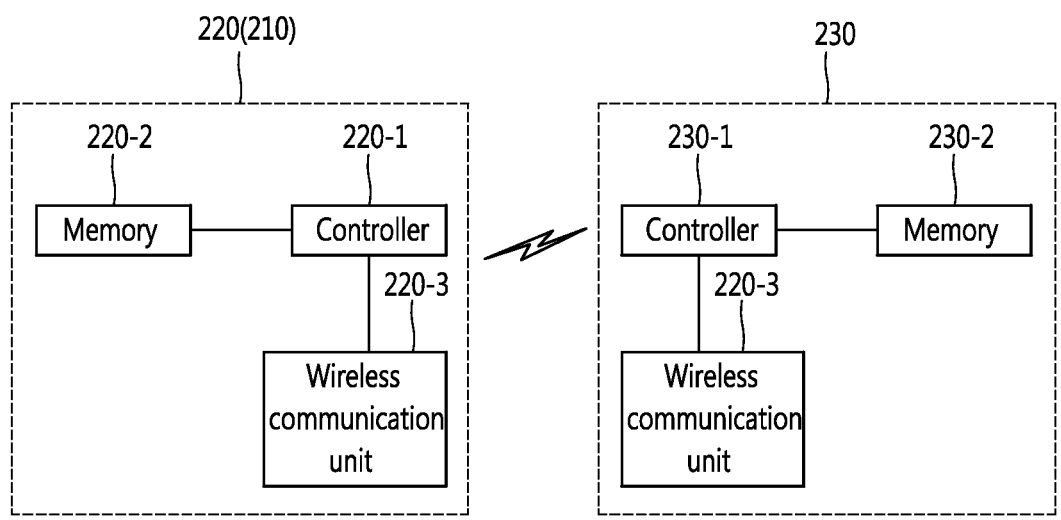
FIG. 10 illustrates an internal block diagram of a terminal, base station, and central node in a wireless access system to which one embodiment of the present invention can be applied.

FIG. 10 illustrates an internal block diagram of a terminal, base station, and central node in a wireless access system to which one embodiment of the present invention can be applied.

The terminal 230 comprises a controller 230-1, memory 230-2, and wireless communication (RF) unit 230-3.

The terminal 230 can be fixed or mobile; and can be called a UE (User Equipment), UT (User Terminal), SS (Subscriber Station), wireless device, AMS (Advanced Mobile Station), or user.

Also, the terminal comprises a display unit and user interface unit.

The controller 230-1 implements a proposed function, procedure, and/or method. Layers of a radio interface protocol can be implemented by the controller 230-1.

The memory 230-2, being connected to the controller 230-1, stores a protocol or parameters for carrying out wireless communication. In other words, the memory 230-2 stores a terminal operating system, application, and ordinary files. The RF unit 230-3, being connected to the controller 230-1, transmits and/or receives wireless signals.

In addition, the display unit displays various types of information, and can employ well-known elements such as LCD (Liquid Crystal Display) and OLED (Organic Light Emitting Diode). The user interface unit can be implemented as a combination of user interfaces such as a keypad and touch screen.

The base station 220 comprises a controller 220-1, memory 220-2, and wireless communication (RF) unit 220-3.

At this time, the base station 220 usually refers to a fixed station communicating with terminals, and can also be called NodeB, BTS (Base Transceiver System), and access point. More than one cell can be defined for one base station.

The central node (CN) can constitute one apparatus along with the base station, or it can be implemented as a separate device. The central node can also include a controller, memory, and wireless communication unit.

The controller 220-1 implements a proposed function, procedure, and/or method. Layers of a radio interface protocol can be implemented by the controller 230-1.

The memory 220-2, being connected to the controller 220-1, stores a protocol or parameters for carrying out wireless communication.

The RF unit 220-3, being connected to the controller 220-1, transmits and/or receives wireless signals.

The controller 210-1, 220-1 can include ASIC (Application-Specific Integrated Circuit), other chipsets, logic circuit and/or data processing device. The memory 210-2, 220-2 can include ROM (Read-Only Memory), RAM (Random Access Memory), flash memory, memory card, storage medium and/or other storage devices. The RF unit 210-3, 220-3 can include a baseband circuit for processing wireless signals. In case embodiments are implemented by software, the methods described above can be implemented by modules (procedures, functions, and the like) carrying out the functions described above. The modules are stored in the memory 210-2, 220-2 and can be executed by the controller 210-1, 220-1.

The memory 210-2, 220-1 can be installed inside or outside the controller 210-1, 210-2 and can be connected to the controller 210-1, 220-1 through various means well known in the fields of the art.

The technical terms introduced in this document are intended only to illustrate particular embodiments, and it should be noted that they are not meant to limit the technical scope of the present invention. Also, unless defined differently, the technical terms used in this document should be understood by those skilled in the art to convey the conventional meaning, and they should not be interpreted to have excessively comprehensive or excessively restricted meaning. Also, in case certain technical terms used in this document fail to convey the original intent of the technical principles of the present invention, they should be replaced with other technical terms that allows for proper understanding of those skilled in the art. Also, ordinary terms used in this document should be interpreted as defined in the dictionary or according to the context, and they should not be interpreted in an excessively restricted meaning.

Unless defined differently in an explicit form, singular expressions in this document include plural expressions. The term of "comprise" or "include" should not be interpreted to necessarily include every single constituting element or step specified in this document. It should be understood that part of constituting elements or steps may not be included or may further include additional constituting elements or steps.

Terms including ordinal numbers such as first and second can be used for describing various components but the components should not be limited by the terms. The terms are introduced only for the purpose of distinguishing one component from the others. For example, a first component may be called a second component without departing from the scope of the present invention and vice versa.

If a component is said to be "linked" or "connected" to a different component, the component may be directly linked or connected to the different component but a third component may exist to connect the two components even though the two components may be connected directly. On the other hand, if a component is said to be "linked directly" or "connected directly" to another component, it should be interpreted that there is no further component between the two components.

The embodiments described above are a combination of constituting elements and features of the present invention in particular forms. Unless otherwise specified, each constituting element or feature should be regarded to be selective. Each constituting element or feature can be embodied solely without being combined with other constituting element or feature. It is also possible to construct embodiments of the present invention by combining part of constituting elements and/or features. The order of operations illustrated in the embodiments of the present invention can be changed. Part of a structure or feature of an embodiment can be included by another embodiment or replaced with the corresponding structure or feature of another embodiment. It should be clear that embodiments can also be constructed by combining those claims revealing no explicit reference relationship with one another, or the combination can be included as a new claim in a revised application of the present invention afterwards.

The invention claimed is:

1. A method for allocating, by a first upper layer entity, resources to a first access point (AP) in a wireless access system including the first AP, a second AP, the first upper layer entity for managing the first AP and a second upper layer entity for managing the second AP, the method comprising:
    detecting, by the first upper layer entity, a change in minimum guaranteed resource amount allocated to the first AP;
    acquiring, by the first upper layer entity, first information on a number of the second AP adjacent to the first AP and second information on weight for the second AP assigned the second AP;
    based on the first information and the second information, determining, by the first upper layer entity, minimum guaranteed resource amount for the first AP,
    wherein if weight for the first AP is equal to the weight for the second AP regardless of a number of the first AP and the number of the second AP, the minimum guaranteed resource amount for the first AP is determined based on a proportion of the number of the first AP and minimum guaranteed resource amount for the second AP is determined based on a proportion of the number of the second AP,
    wherein if weight for the first AP which is set based on the number of the first AP is not equal to the weight for the second AP which is set based on the number of the second AP, the minimum guaranteed resource amount for the first AP is determined the same as minimum guaranteed resource amount for the second AP regardless of a proportion of the number of the first AP; and
    transmitting, by the first upper layer entity, the determined minimum guaranteed resource amount for the first AP to the first AP.

2. The method of claim 1,
    wherein the change in the minimum guaranteed resource amount occurs when a new AP is added to the wireless access system or locations of the plurality of APs are changed.

3. The method of claim 1,
    wherein a degree of interference with the second AP is determined by measuring frequency of appearance of links being capable of being recognized through carrier sensing of links between the first AP and the second AP and comparing a measurement result with a predefined threshold.

4. The method of claim 3,
    wherein if the measurement result is larger than the predefined threshold, it is determined that the interference is developed,
    wherein if the measurement result is smaller than or equal to the predefined threshold, it is determined that the interference is not developed.

5. A first upper layer entity for allocating resources to a first access point (AP) in a wireless access system including the first AP, a second AP, the first upper layer entity for managing the first AP and a second upper layer entity for managing the second AP,
    the first upper layer entity comprising:
    a wireless communication unit for communicating wireless signals with external entities; and
    a controller connected to the wireless communication unit,
    wherein the controller is configured to:
    detect a change in minimum guaranteed resource amount allocated to the first AP;
    acquire first information on a number of the second AP adjacent to the first AP and second information on weight for the second AP assigned to the second AP; and
    determine minimum guaranteed resource amount for the first AP based on the first information and the second information,
    wherein if weight for the first AP is equal to the weight for the second AP regardless of a number of the first AP and the number of the second AP, the minimum guaranteed resource amount for the first AP is determined based on a proportion of the number of the first AP and minimum guaranteed resource amount for the second AP is determined based on a proportion of the number of the second AP,
    wherein if weight for the first AP which is set based on the number of the first AP is not equal to the weight for the second AP which is set based on the number of the second AP, the minimum guaranteed resource amount for the first AP is determined the same as minimum guaranteed resource amount for the second AP regardless of a proportion of the number of the first AP; and
    transmit the determined minimum guaranteed resource amount for the first AP to the first AP.

6. The first upper layer entity of claim 5,
    wherein the change in the minimum guaranteed resource amount occurs when a new AP is added to the wireless access system or locations of the plurality of APs are changed.

7. The first upper layer entity of claim 5,
    wherein a degree of interference with the second AP is determined by measuring frequency of appearance of links being capable of being recognized through carrier sensing of links between the first AP and the second AP and comparing a measurement result with a predefined threshold.

8. The first upper layer entity of claim 7,
    wherein if the measurement result is larger than the predefined threshold, it is determined that the interference is developed,
    wherein if the measurement result is smaller than or equal to the predefined threshold, it is determined that the interference is not developed.

* * * * *